US012566663B2

(12) United States Patent
Dancho et al.

(10) Patent No.: US 12,566,663 B2
(45) Date of Patent: Mar. 3, 2026

(54) VERIFICATION OF DATA TRANSFER SOURCE IN MEMORY DEVICES

(71) Applicant: SanDisk Technologies LLC, Austin, TX (US)

(72) Inventors: Mark Dancho, Chandler, AZ (US); Mervyn Wongso, Gilbert, AZ (US)

(73) Assignee: Sandisk Technologies, Inc., Milpitas, CA (US)

( * ) Notice: Subject to any disclaimer, the term of this patent is extended or adjusted under 35 U.S.C. 154(b) by 17 days.

(21) Appl. No.: 18/668,520

(22) Filed: May 20, 2024

(65) Prior Publication Data

US 2025/0355760 A1      Nov. 20, 2025

(51) Int. Cl.
*G06F 11/10* (2006.01)

(52) U.S. Cl.
CPC ................................ *G06F 11/1004* (2013.01)

(58) Field of Classification Search
CPC .................................................... G06F 11/1004
See application file for complete search history.

(56) References Cited

U.S. PATENT DOCUMENTS 8,341,500 B2    12/2012  Byom
9,582,670 B2     2/2017  Feng

| | | |
|---|---|---|
| 11,003,537 B2 | 5/2021 | Troia |
| 11,150,985 B2 | 10/2021 | Zhang |
| 2015/0227473 A1* | 8/2015 | Feng ........................ G06F 21/79 |
| | | 713/193 |
| 2016/0328288 A1* | 11/2016 | Ho ......................... G06F 3/0683 |
| 2019/0372711 A1* | 12/2019 | Luo ........................... H04L 1/00 |
| 2021/0191660 A1* | 6/2021 | Boehm ................. G06F 3/0622 |
| 2023/0195561 A1 | 6/2023 | Bhatia |
| 2023/0393769 A1 | 12/2023 | Durham |

* cited by examiner

*Primary Examiner* — Thien Nguyen
(74) *Attorney, Agent, or Firm* — Arlene Neal; NEAL BLIBO LLC

(57)                    ABSTRACT

A storage device may detect when data transferred from a memory device is read from a correct physical address on the memory device. The storage device includes a memory device to store data wherein data stored on the memory is accessed by referencing physical addresses on the memory device. A controller on the storage device may send a read instruction to the memory device to read data at a first physical address. When the controller receives the data from the memory device, the controller may descramble the data with a seed based on the first physical address. The seed is supplied by the controller. The controller may also perform a check and determine when an expected value is absent from the data. The controller may detect that the data is read from a second physical address when the controller is unable to retrieve the expected value from descrambled data.

20 Claims, 6 Drawing Sheets

100

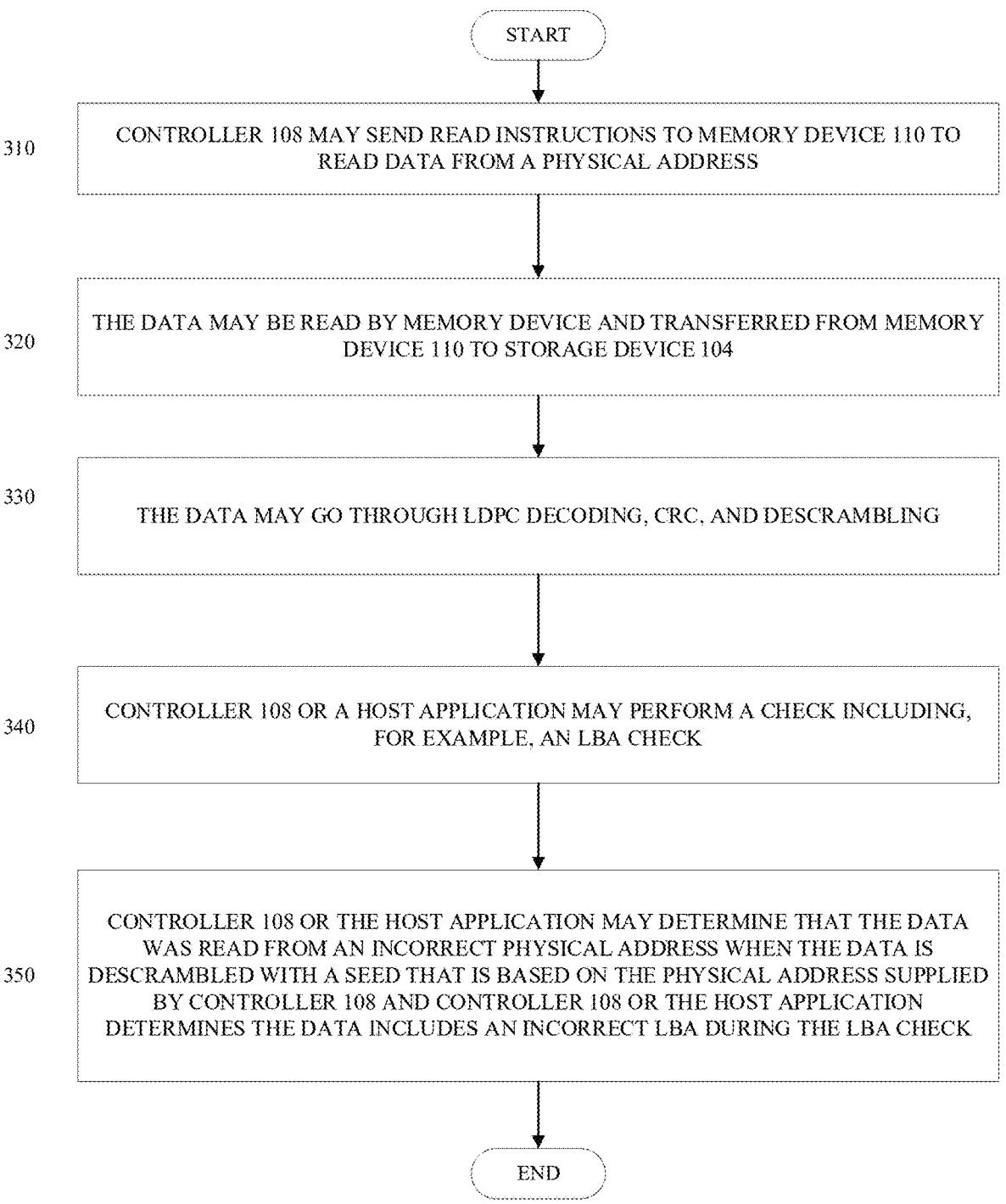

START

310     CONTROLLER 108 MAY SEND READ INSTRUCTIONS TO MEMORY DEVICE 110 TO READ DATA FROM A PHYSICAL ADDRESS

320     THE DATA MAY BE READ BY MEMORY DEVICE AND TRANSFERRED FROM MEMORY DEVICE 110 TO STORAGE DEVICE 104

330     THE DATA MAY GO THROUGH LDPC DECODING, CRC, AND DESCRAMBLING

340     CONTROLLER 108 OR A HOST APPLICATION MAY PERFORM A CHECK INCLUDING, FOR EXAMPLE, AN LBA CHECK

350     CONTROLLER 108 OR THE HOST APPLICATION MAY DETERMINE THAT THE DATA WAS READ FROM AN INCORRECT PHYSICAL ADDRESS WHEN THE DATA IS DESCRAMBLED WITH A SEED THAT IS BASED ON THE PHYSICAL ADDRESS SUPPLIED BY CONTROLLER 108 AND CONTROLLER 108 OR THE HOST APPLICATION DETERMINES THE DATA INCLUDES AN INCORRECT LBA DURING THE LBA CHECK

END

VERIFICATION OF DATA TRANSFER SOURCE IN MEMORY DEVICES

BACKGROUND OF THE INVENTION

A storage device may be communicatively coupled to a host and to non-volatile memory including, for example, a NAND flash memory device on which the storage device may store data received from the host. The storage device may store data in blocks on the memory device and the host may address the data using logical block addresses (LBA) that may be mapped to physical addresses on the memory device. The storage device may store and maintain a mapping table that maps an LBA associated with data to a physical address on the memory device and a controller in the storage device may use the mapping table to identify where data associated with a LBA is physically stored on the memory device.

To read data stored on the memory device, the controller may use information in the mapping table to identify the physical address where the data is stored and may send that physical address to the memory device for the memory device to retrieve the data from the physical address provided by the storage device. When the memory device receives a read command with a physical address for data from the controller, the memory device may retrieve the data stored at the physical address provided by the controller. The memory device may also receive a transfer command to transfer the data read from the memory device and the memory device may transfer data to the storage device in chunks including, for example, 4K chunks, 16K chunks, 512 bytes, etc.

When reading data from the memory device, it may be important for controller to ensure that the data being transferred from the memory device to the controller is the actual data that was requested from the memory device. In rare cases, an error may occur wherein the memory device may transfer the wrong/incorrect data, i.e., data read from another/incorrect physical address. For example, if the memory device missed a read command but received a transfer command, the memory device may transfer data previously read from another physical address to the storage device. In another example, an error in the transmission line between the storage device and the memory device may cause the memory device to read an incorrect physical address. When the memory device transfers data from the incorrect physical address to the storage device, a physical address misread occurs.

When data is retrieved from the memory device, the controller may decode the data through a low-density parity-check (LPDC) engine and perform a cyclic redundancy check (CRC) to determine if the data is good data. Data retrieved from an incorrect physical address may be decoded by the LDPC engine if the data is in the same format as the data requested from the memory device and the data may also pass the CRC. In some cases, to protect against physical address misreads, the controller or firmware may verify the LBA or another similar identifier such as a namespace plus LBA or a translated LBA associated with the physical block address. Consider an example where data associated with a LBA (for example, LBA 155) is written to a physical address (for example, physical address ten). During maintenance operations, the data may be rewritten to other physical addresses, for example, physical address twenty and physical address thirty. As such, physical addresses ten, twenty, and thirty may be associated with the same LBA (i.e., LBA 155). If data is to be read from physical address twenty but the data is retrieved from physical address ten or physical address thirty, when the controller verifies the LBA or another similar identifier in data read from the memory device as means for protecting against physical address misreads, the controller may be unable to determine that the data was retrieved from an incorrect physical address.

Failure to detect physical address misreads close to the memory device may require application-level checks. For example, higher-level functions such as host applications may implement physical address misreads checks. Because higher-level function and may have different kinds of capabilities, the checks performed by higher-level functions may be fragmented, wherein in some cases some higher-level functions may check for physical address misreads, and in some cases, some higher-level functions may fail to check for physical address misread.

In an implementation, a physical tag (p-tag) may be added to data being written to the memory device. Data with the p-tag may include the physical address. A higher-level function may verify that data with a given p-tag is retrieved from the proper location. However, p-tags use up bytes in the data written to the memory device, effectively weakening error correction code (ECC) protection by taking bytes that could have been used for the ECC. In addition, when encoding and decoding p-tags the controller must splice that p-tag information into and out of the data from a higher-level application. This may result in extra runtime overhead.

SUMMARY OF THE INVENTION

In some implementations, the storage device may detect when data transferred from a memory device is read from a correct physical address on the memory device. The storage device includes a memory device to store data wherein data stored on the memory device is accessed by referencing physical addresses on the memory device. The storage device also includes a controller to send a read instruction to the memory device to read data at a first physical address. The controller may receive the data from the memory device and descramble the data with a seed supplied by the controller. The controller may also determine when the data is read from a second physical address based on descrambling of the data with the seed supplied by the controller.

In some implementations, a method is provided on a storage device for detecting when data transferred from a memory device is read from a correct physical address on the memory device. The method includes sending a read instruction to a memory device to read data at a first physical address. The method also includes receiving the data from the memory device and descrambling the data with a seed supplied by the controller. The method further includes determining when the data is read from a second physical address based on descrambling of the data with the seed supplied by the controller.

In some implementations, a method is provided on a storage device for detecting when data transferred from a memory device is read from a correct physical address on the memory device. The method includes sending a read instruction to a memory device to read data at a first physical address. The method also includes receiving the data from the memory device and descrambling the data with a seed based on the first physical address. The seed is supplied by the controller. The method further includes performing a check and determining when an expected value is absent from the data; The method also includes detecting that the data is read from a second physical address when the controller is unable to retrieve the expected value from descrambled data.

BRIEF DESCRIPTION OF THE DRAWINGS

FIG. 3 is another example flow diagram for detecting when data transferred from the memory device is read from a correct physical address in accordance with some implementations.

Figure 1:
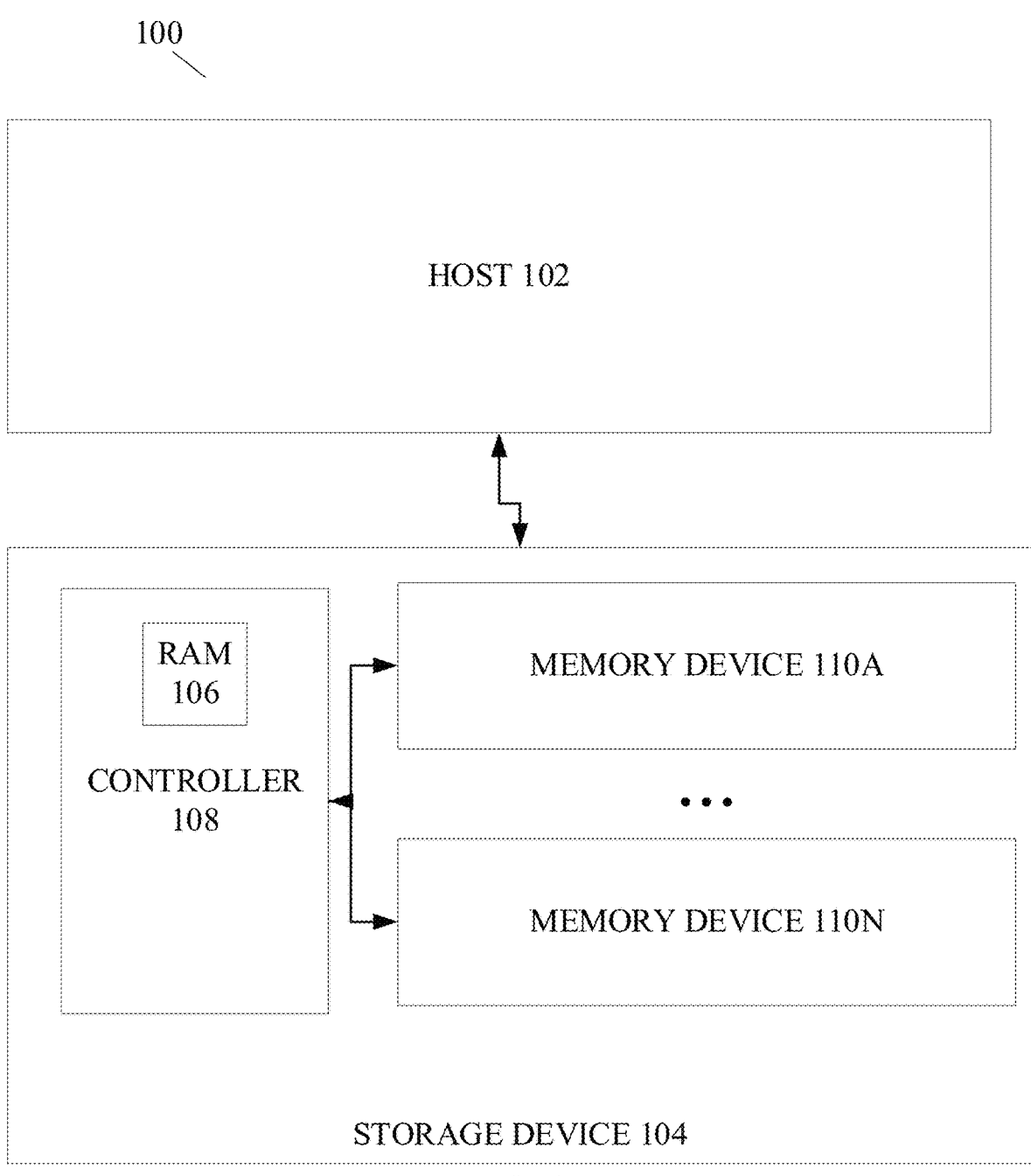
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the sane or similar elements.

FIG. 1 is a schematic block diagram of an example system in accordance with some implementations. System 100 includes a host 102 and a storage device 104 that may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106. a controller 108 and one or more non-volatile memory devices 110*a*-110*n* (referred to herein as the memory device(s) 110). Storage device 104 may be, for example, a solid-state drive (SSD). RAM 106 may be used to store information including, for example, a logical-to-physical address mapping table used by controller 108. Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may include multiple dies which may be divided into blocks. Data may be stored in the blocks in various formats, with the formats being defined by the number of bits that may be stored per memory cell. Memory device 110 may be included in storage device 104 or may be otherwise communicatively coupled to storage device 104.

When storage device 104 wants to write data to memory device 110, controller 108 may pass the data through a scrambler to randomize the data and address issues associated with storing data with repeating patterns on memory device 110. Controller 108 may also perform a cyclic redundancy check (CRC) and encode the data using, for example, a low-density parity-check (LPDC) engine. The scrambler may include a seed that may be based on the physical address in memory device 110 where the data is to be written.

In current systems, when controller 108 sends read instructions to memory device 110 and the data is transferred from memory device 110 to storage device 104, the data may be decoded using, for example, the LDPC engine. A CRC may be carried out to ensure that the data was properly decoded. Thereafter, the data may be descrambled by the scrambler/descrambler. When data read from memory device goes through a processing flow including LDPC decoding, CRC, and descrambling, the descrambler may be seeded with a physical address obtained from memory device 110. For example, the descrambler may be seeded with the physical address where the data was retrieved from. In these cases, data read from the wrong physical address would be properly descrambled because the descramble seed for the data would be based on the incorrect physical location. To ensure that the descrambled data is retrieved from the correct physical address, other checks may be performed by controller 108 or by higher-level applications. For example, applications on host 102 may check the logical block address (LBA) or another similar identifier in the data to ensure that the correct data was read from memory device 110. As noted, there may be issues associated with verifying the LBA or another similar identifier in data read from memory device 110 as a means for protecting against physical address misreads.

In an implementation, the descrambler may be seeded with a first physical address supplied by controller 108, i.e., with the physical address where the data is to be read from. When controller 108 sends read instructions to memory device 110 and the data is transferred from memory device 110 to storage device 104, the data may be decoded using, for example, the LDPC engine. The data may be descrambled, and after descrambling the data, a CRC may be carried out. If the data is read from an incorrect location (also referred to herein as a second physical address) and the descrambler is seeded with the first physical address provided by controller 108 (i.e., a physical address associated with the correct location), a descramble error may occur. By rearranging the processing flow, the CRC may be used to ensure that the data is properly decoded and descrambled. When the data is determined to be improperly descrambled based on the cyclic redundancy check, controller 108 may determine that the data is read from the second physical address. When the data is determined to be properly descrambled based on the cyclic redundancy check, controller 108 may determine that the data is read from the first physical address.

In cases where data is read from memory device 110 and the data goes through LDPC decoding, CRC, and descrambling, if the data is read from an incorrect (second) physical address and passes the decoding and CRC, a descramble error may occur when the data is descrambled with a seed that is based on the physical address supplied by controller 108. When a descramble error occurs, controller 108 may be unable to retrieve an expected value from descrambled data when controller 108 performs a high-level check on the descrambled data. If the descramble is successful, controller 108 may be able to retrieve the expected value from descrambled data. For example, when a descramble error occurs and controller 108 performs a high-level check on the descrambled data, the data may not include the correct LBA or another similar identifier. When controller 108 or a host application later performs an LBA check or a check for another similar identifier, the check may fail (for example, the LBA in the data may not match the LBA expected to be in the data) and controller 108 or a host application may determine that the data was read from an incorrect physical address.

In some implementations, controller 108 or a host application may insert a tag into data written to memory address. The tag may be a constant value, for example, forty-seven, that may be included in some or all the data stored on memory device 110. When data is read from memory device 110, rather than perform an LBA check or a check for another similar identifier on the descrambled data seeded based on the physical address supplied by controller 108, controller 108 or a host application may retrieve the tag from data read from memory device 110. If the data is read from an incorrect (second) physical location, when the data is descrambled with a seed that is based on the physical address supplied by controller 108, a descramble error may occur. Based on the descramble error, the data may include an improper tag value. For example, when the data is read from an incorrect (second) physical address and is descrambled with a seed that is based on the physical address supplied by controller 108, rather than including the tag with a value of forty-seven (i.e., a value that may be included in some or all of the data stored on memory device), the data may include another value in the tag field.

Consider an example where the tag with a value of, for example, forty-seven is inserted in data written on memory device 110 and data associated with a LBA (for example, LBA 155) is written to a first physical address (for example, physical address ten). During maintenance operations, the data may be rewritten to other physical addresses, for example, physical address twenty and physical address thirty. As such, physical addresses ten, twenty, and thirty may be associated with the same LBA (i.e., LBA 155). If controller 108 sends a read request to read data from the first physical address (i.e., physical address twenty), when the data is transferred from memory device 110 to storage device 104, the descramble may be seeded with the physical address twenty supplied by controller 108. If the data is retrieved from physical address ten, when memory device 110 sends the data to storage device 104, the data may be decoded, a CRC may be carried out, and the data may be descrambled, wherein the data may not include a tag value of forty-seven because the descramble was seeded with the physical address twenty supplied by controller 108 and not physical address ten where the data was read from. When controller 108 or a host application performs a high-level check on the descrambled data, controller 108 or the host application may verify that the data was read from an incorrect address because the tag value in the data would be different from the expected tag value.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
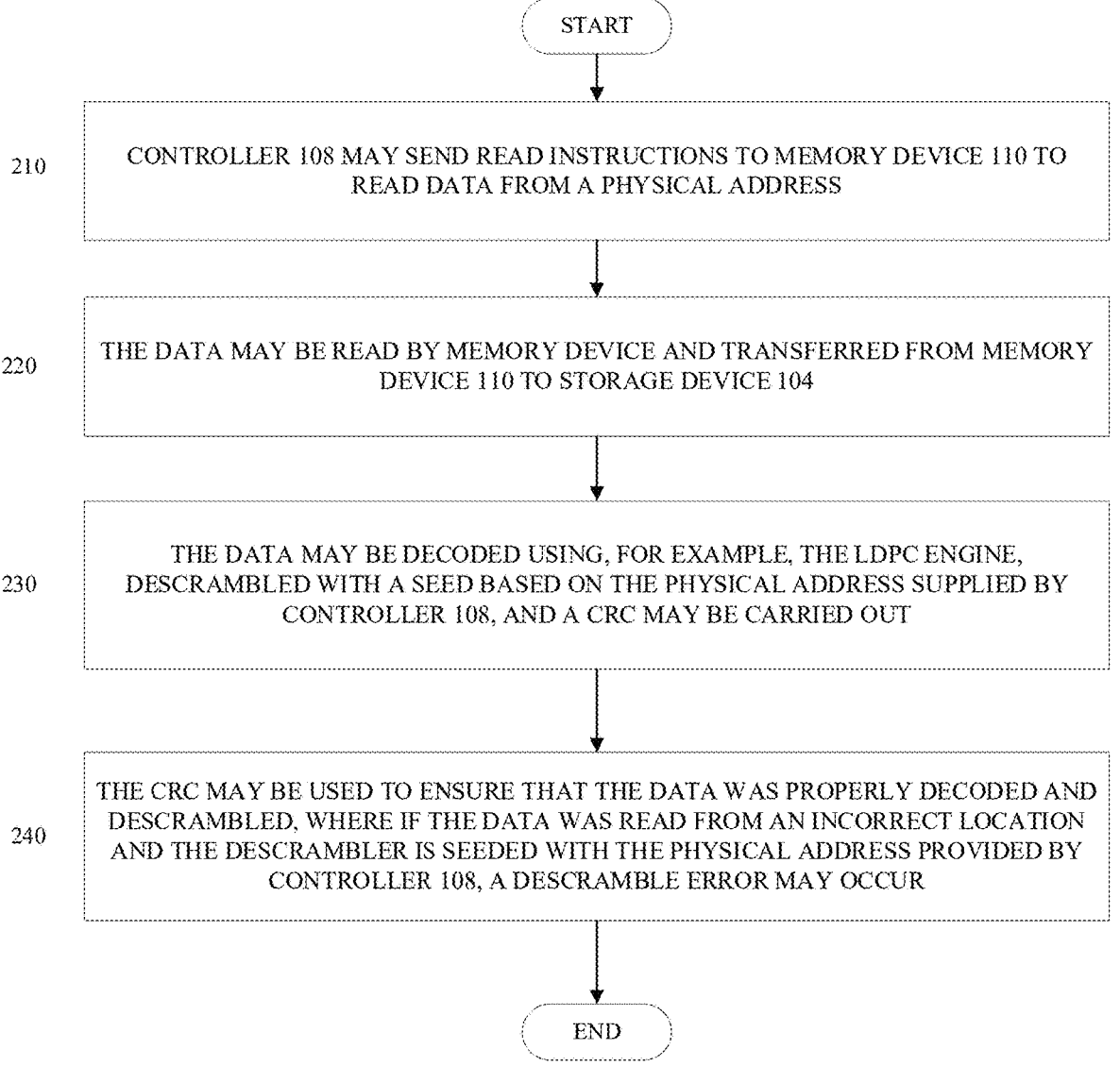
FIG. 2 is an example flow diagram for detecting when data transferred from a memory device is read from a correct physical address in accordance with some implementations.

FIG. 2 is an example flow diagram for detecting when data transferred from a memory device is read from a correct physical address in accordance with some implementations. At 210, controller 108 may send read instructions to memory device 110 to read data from a physical address. At 220, the data may be read by memory device and transferred from memory device 110 to storage device 104. At 230, the data may be decoded using, for example, the LDPC engine, descrambled with a seed based on the physical address supplied by controller 108, and a CRC may be carried out. At 240, the CRC may be used to ensure that the data is properly decoded and descrambled, where if the data was read from an incorrect location and the descrambler is seeded with the physical address provided by controller 108, a descramble error may occur. As indicated above FIG. 2 is provided as an example. Other examples may differ from what is described in FIG. 2.

FIG. 3 is another example flow diagram for detecting when data transferred from the memory device is read from a correct physical address in accordance with some implementations. At 310, controller 108 may send read instructions to memory device 110 to read data from a physical address. At 320, the data may be read by memory device and transferred from memory device 110 to storage device 104. At 330, the data may go through LDPC decoding, CRC, and descrambling. At 340, controller 108 or a host application may perform a check including, for example, an LBA check. At 350, controller 108 or the host application may determine that the data was read from an incorrect physical address when the data is descrambled with a seed that is based on the physical address supplied by controller 108 and controller 108 or the host application determines the data includes an incorrect LBA during the LBA check. As indicated above FIG. 3 is provided as an example. Other examples may differ from what is described in FIG. 3.

Figure 4:
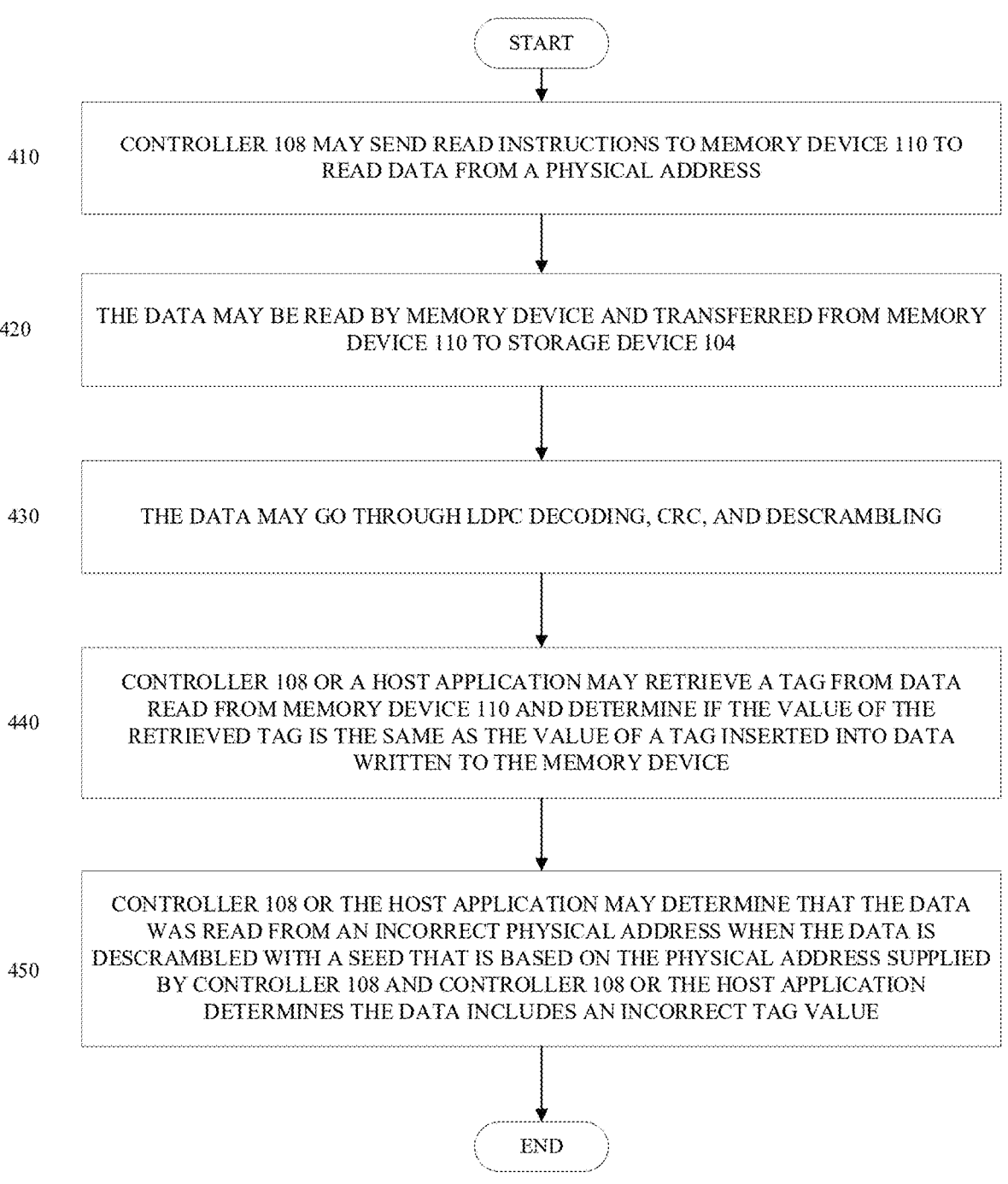
FIG. 4 is another example flow diagram for detecting when data transferred from the memory device is read from a correct physical address in accordance with some implementations.

FIG. 4 is another example flow diagram for detecting when data transferred from the memory device is read from a correct physical address in accordance with some implementations. At 410, controller 108 may send read instructions to memory device 110 to read data from a physical address. At 420, the data may be read by memory device and transferred from memory device 110 to storage device 104. At 430, the data may go through LDPC decoding, CRC, and descrambling. At 440, controller 108 or a host application may retrieve a tag from data read from memory device 110 and determine if the value of the retrieved tag is the same as the value of a tag inserted into data written to the memory device. At 450, controller 108 or the host application may determine that the data was read from an incorrect physical address when the data is descrambled with a seed that is based on the physical address supplied by controller 108 and controller 108 or the host application determines the data includes an incorrect tag value. As indicated above FIG. 4 is provided as an example. Other examples may differ from what is described in FIG. 4.

Figure 5:
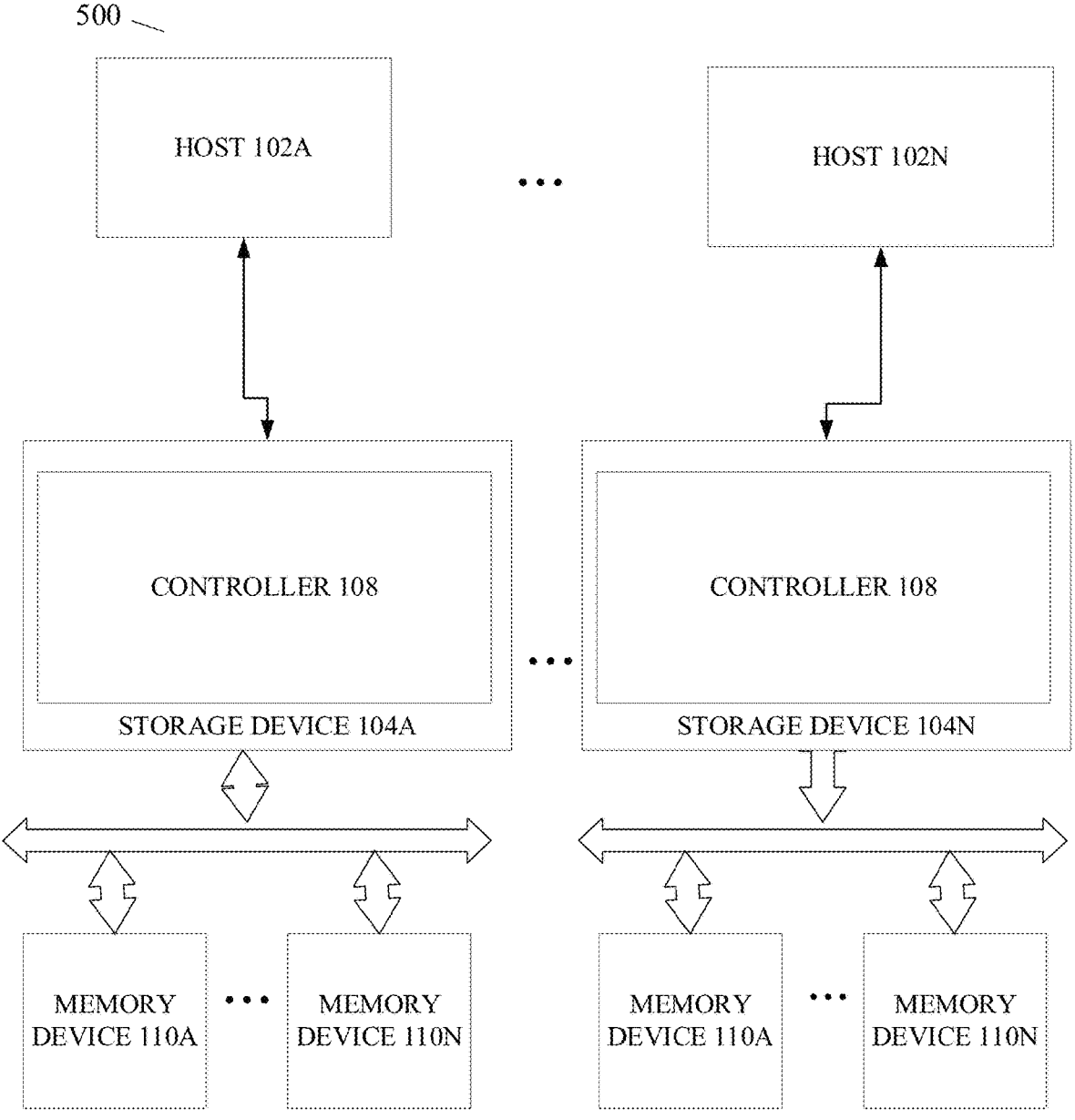
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and one or more storage devices 104*a*-104*n* (referred to herein as storage device(s) 104). Storage device 104 may include a controller 108 to determine when data transferred from memory device 110 to storage device 104 is read from a correct physical address on memory device 110. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric(NVMe-oF) Internet Small Computer Systems Interface(iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

Figure 6:
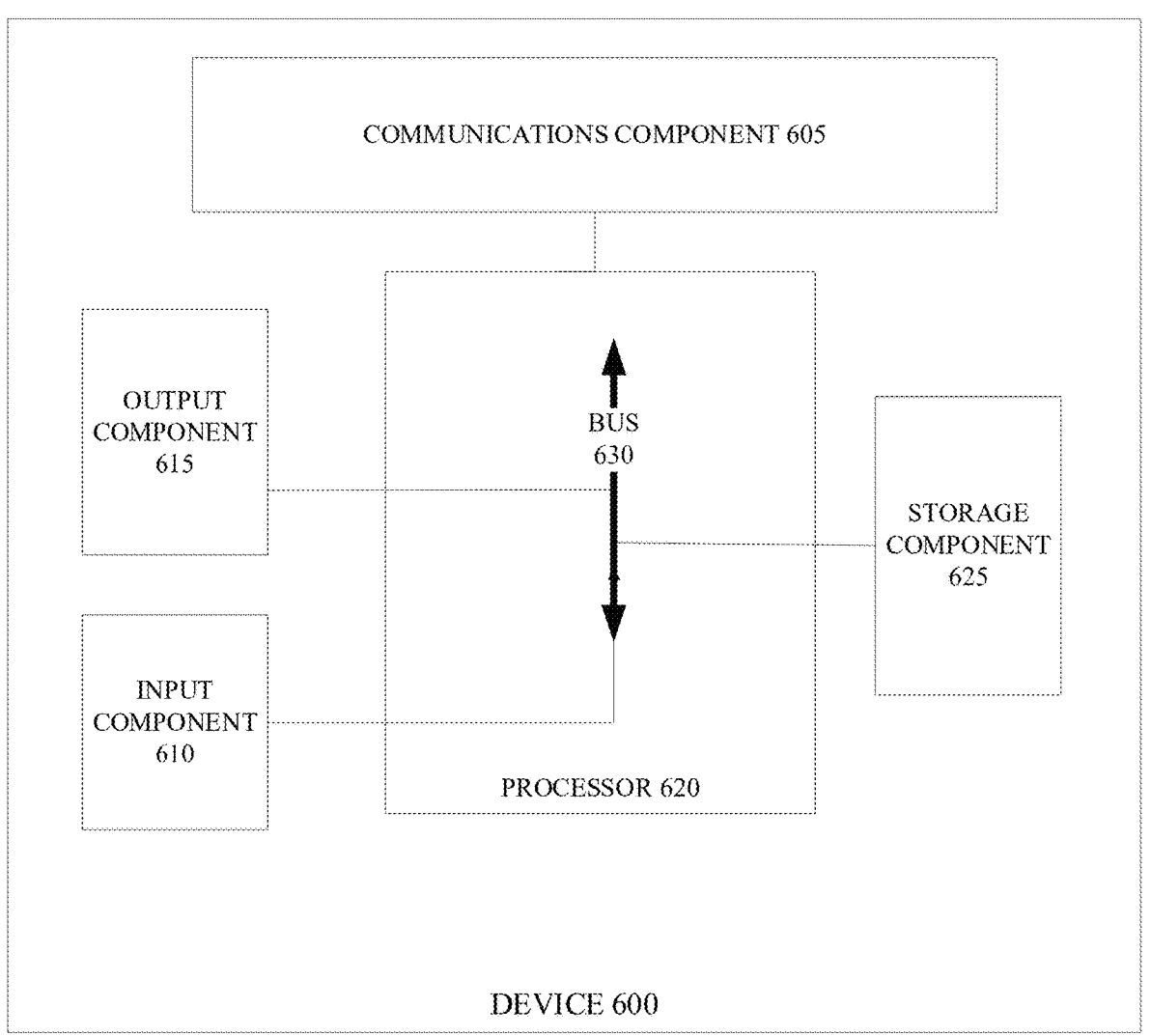
FIG. 6 is a diagram of example components of one or more devices of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, and a network/data connection port, or the like), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and network/data connection port, or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

The foregoing disclosure provides illustrative and descriptive implementations but is not intended to be exhaustive or to limit the implementations to the precise foin disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to detect when data transferred from a memory device is read from a correct physical address on the memory device, the storage device comprises:

a memory device to store data including a tag inserted into the data, wherein data stored on the memory device is accessed by referencing physical addresses on the memory device, and a controller to send a read instruction to the memory device to read data at a first physical address, receive the data from the memory device, descramble the data with a seed including the first physical address supplied by the controller, and determine when the data is read from a second physical address based on descrambling of the data with the seed supplied by the controller.

2. The storage device of claim 1, further including a scrambler to scramble the data when it is written to the memory device and descramble the data when it is read from the memory device, wherein the scrambler is seeded with the first physical address supplied by the controller.

3. The storage device of claim 1, wherein when the data is received from the memory device, the data is decoded, descrambled, and a cyclic redundancy check is performed, wherein the cyclic redundancy check ensures that the data is properly decoded and descrambled.

4. The storage device of claim 3, wherein when the data is determined to be improperly descrambled based on the cyclic redundancy check, the controller determines that the data is read from the second physical address and when the data is determined to be properly descrambled based on the cyclic redundancy check, the controller determines that the data is read from the first physical address.

5. The storage device of claim 1, wherein when the data is received from the memory device, the data is decoded, a cyclic redundancy check is performed, and the data is descrambled.

6. The storage device of claim 5, wherein the controller determines that the data is read from the second physical address when the controller performs a check and is unable to retrieve the tag from descrambled data and the controller determines that the data is read from the first physical address when the controller performs the check and retrieves the tag from the descrambled data.

7. The storage device of claim 6, wherein the expected value is a logical block address.

8. The storage device of claim 6, wherein the tag is a constant value.

9. A method in a storage device for detecting when data transferred from a memory device is read from a correct physical address on the memory device, the storage device comprises a controller to execute the method comprising:

sending a read instruction to a memory device to read data, including a tag inserted into the data, at a first physical address;

receiving the data from the memory device;

descrambling the data with a seed including the first physical address supplied by the controller; and determining when the data is read from a second physical address based on descrambling of the data with the seed supplied by the controller.

10. The method of claim 9, further comprising descrambling the data with the seed based on the first physical address supplied by the controller.

11. The method of claim 9, wherein the receiving further comprises decoding, descrambling, and performing a cyclic redundancy check on the data, wherein the cyclic redundancy check ensures that the data is properly decoded and descrambled.

12. The method of claim 11, wherein the determining comprises determining that the data is read from the second physical address when the data is determined to be improperly descrambled based on the cyclic redundancy check.

13. The method of claim 11, wherein the determining comprises determining that the data is read from the first physical address when the data is determined to be properly descrambled based on the cyclic redundancy check.

14. The method of claim 9, wherein the receiving further comprises decoding, performing a cyclic redundancy check on the data, and descrambling the data.

15. The method of claim 14, wherein the determining comprises determining that the data is read from the second physical address when the controller performs a check and is unable to retrieve an expected value from descrambled data.

16. The method of claim 14, wherein the determining comprises determining that the data is read from the first physical address when the controller performs a check and retrieves an expected value from the descrambled data.

17. The method of claim 16, wherein the expected value is one of a logical block address and a tag included in the data stored on the memory device and the tag includes a constant value.

18. A method in a storage device for detecting when data transferred from a memory device is read from a correct physical address on the memory device, the storage device comprises a controller to execute the method comprising:

sending a read instruction to a memory device to read data including a tag inserted into the data at a first physical address;

receiving the data from the memory device;

descrambling the data with a seed including the first physical address, wherein the seed is supplied by the controller;

performing a check and determining when an expected value is absent from the data; and detecting that the data is read from a second physical address when the controller is unable to retrieve the expected value from descrambled data.

19. The method of claim 18, wherein the detecting comprises detecting that the data is read from the first physical address when the controller retrieves the expected value from the descrambled data.

20. The method of claim 18, wherein the expected value is one of a logical block address and a tag included in the data stored on the memory device and the tag includes a constant value.

*  *  *  *  *